(12) United States Patent
Suzuki et al.

(10) Patent No.: US 8,905,196 B2
(45) Date of Patent: Dec. 9, 2014

(54) ELEVATOR GROUP CONTROL APPARATUS HAVING STANDBY OPERATION

(75) Inventors: Naohiko Suzuki, Tokyo (JP); Yoshimasa Koba, Tokyo (JP); Sakurako Tokura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 677 days.

(21) Appl. No.: 13/254,190

(22) PCT Filed: May 26, 2009

(86) PCT No.: PCT/JP2009/059616
§ 371 (c)(1),
(2), (4) Date: Sep. 1, 2011

(87) PCT Pub. No.: WO2010/137118
PCT Pub. Date: Dec. 2, 2010

(65) Prior Publication Data
US 2011/0308896 A1    Dec. 22, 2011

(51) Int. Cl.
*B66B 1/18* (2006.01)
*B66B 1/24* (2006.01)

(52) U.S. Cl.
CPC ......... *B66B 1/2458* (2013.01); *B66B 2201/102* (2013.01); *B66B 2201/211* (2013.01); *B66B 2201/216* (2013.01); *B66B 2201/241* (2013.01); *B66B 2201/243* (2013.01); *B66B 2201/402* (2013.01); *B66B 2201/403* (2013.01); *Y02B 50/122* (2013.01)
USPC .......................................... 187/382; 187/392

(58) Field of Classification Search
USPC ........................... 187/247, 380–388, 391–393
See application file for complete search history.

(56) References Cited

U.S. PATENT DOCUMENTS

| | | | | |
|---|---|---|---|---|
| 5,241,142 A | * | 8/1993 | Thangavelu | 187/385 |
| 5,274,202 A | * | 12/1993 | Kezer et al. | 187/385 |
| 5,459,665 A | * | 10/1995 | Hikita et al. | 701/118 |
| 8,205,722 B2 | * | 6/2012 | Suihkonen et al. | 187/383 |
| 2012/0152661 A1 | * | 6/2012 | Suzuki | 187/382 |

FOREIGN PATENT DOCUMENTS

| | | |
|---|---|---|
| JP | 59-138580 | 8/1984 |
| JP | 61 155175 | 7/1986 |
| JP | 01192685 A * | 8/1989 |

(Continued)

OTHER PUBLICATIONS

Office Action issued on Apr. 9, 2013 in the corresponding Japanese Patent Application No. 2011-515777 (with Partial English Translation).

(Continued)

*Primary Examiner* — Anthony Salata
(74) *Attorney, Agent, or Firm* — Oblon, Spivak, McClelland, Maier & Neustadt, L.L.P.

(57) ABSTRACT

An elevator group control apparatus performs operation control of a plurality of elevators by detecting a downward traffic flow ratio of traffic flows departing downward from floors higher than a prescribed main floor in the total traffic flow departing from one floor to another. If the downward traffic flow ratio is not less than a prescribed reference value, a standby mode for downward traffic flow is made effective, in which at least one elevator car is caused to be on standby on a floor higher than the main floor and at least one elevator car is caused to be on standby on the main floor.

14 Claims, 3 Drawing Sheets

(56) References Cited

FOREIGN PATENT DOCUMENTS

| JP | 2002 68614 | 3/2002 |
| JP | 2004-99206 | 4/2004 |
| JP | 2007 284180 | 11/2007 |
| JP | 2007 308220 | 11/2007 |
| JP | 2008-162764 | 7/2008 |

OTHER PUBLICATIONS

Korean Office Action Issued Jun. 21, 2013 in Patent Application No. 10-2011-7022995 (with English translation).

International Search Report Issued Jan. 26, 2010 in PCT/JP09/059616 filed May 26, 2009.

Combined Office Action and Search Report issued Jun. 25, 2013 in Chinese Patent Application No. 200980159093.X (with English translaiton).

Office Action issued on Jan. 13, 2014 in the corresponding Chinese Patent Application No. 200980159093.X (with English Translation).

English translation of the International Preliminary Report on Patentability issued Dec. 22, 2011, in PCT/JP2009/059616.

English translation of the Written Opinion of the International Searching Authority issued Jan. 26, 2010, in PCT/JP2009/059616.

Notification of Reason for Refusal issued Jan. 7, 2014 in Japanese Patent Application No. JP 2011-515777 (with partial English translation).

Office Action issued Dec. 7, 2012 in Korean Patent Application No. 10-2011-7022995 (with English translation).

Office Action issued May 30, 2014, in Chinese Patent Application No. 200980159093X with English translation of the text of the Office Action only.

\* cited by examiner

ELEVATOR GROUP CONTROL APPARATUS HAVING STANDBY OPERATION

TECHNICAL FIELD

The present invention relates to an elevator group control apparatus which performs efficient operation control of a plurality of elevators.

BACKGROUND ART

In buildings and the like where there are many elevator users, a plurality of elevators are installed within the same building and these plurality of elevators are group-controlled in order to improve the operation efficiency of all elevators.

A conventional art of an elevator group control apparatus which performs such group control is described in Patent Literature 1 below. The elevator group control apparatus described in Patent Literature 1 has a distributed standby control function. This distributed standby control is performed in order to prevent a plurality of cars from being concentrated on a specific zone. Specifically, control is performed in such a manner that an elevator car whose service has been finished and to which a new call has not been assigned is allocated to a prescribed parking floor. In this group supervisory control apparatus, it is ensured that the above-described distributed standby control is not performed, for example, when the difference between upward traffic demand and downward traffic demand is small.

CITATION LIST

Patent Literature

Patent Literature 1: Japanese Patent Laid-Open No. 2007-284180

SUMMARY OF INVENTION

Technical Problem

In the elevator group control apparatus described in Patent Literature 1, a determination is made as to whether distributed standby control is necessary or not on the basis of the difference between upward traffic demand and downward traffic demand. Therefore, the distributed standby control is not brought into action when the movement of the users is heavy in one direction (in an upward direction or a downward direction) in an unbalanced manner during off hours when the number of elevator users is small, posing the problem that the waiting time of the users becomes long although the power consumption during runs can be reduced.

Besides, because unnecessary elements such as the traffic volume from basement floors to a lobby floor are considered in the detection of traffic demand, this has posed the problem that a determination as to whether the distributed standby control is necessary or not is made inaccurately.

The present invention was made to solve the problems described above, and an object of the invention is to provide an elevator group control apparatus which brings distributed standby control into action when the movement of users is heavy in one direction in an unbalanced manner in time zones accounting for large proportions of an elevator use condition of a day, for example, in off-hour zones and time zones in which traffic demand is relatively small, thereby improving the waiting time of users, and does not bring distributed standby control into action when there is no unbalanced condition of the movement of the users, whereby it is possible to perform energy savings by reducing power consumption during runs without greatly worsening the waiting time of the users.

Solution to Problem

An elevator group control apparatus of the present invention is an apparatus which performs the operation control of a plurality of elevators. The elevator group control apparatus comprises traffic flow detection means which detects a downward traffic flow ratio of traffic flows departing downward from floors higher than a prescribed main floor in the total traffic flow departing from one floor to another, determination means which makes a prescribed standby mode for downward traffic flow effective when the downward traffic flow ratio detected by the traffic flow detection means is not less than a prescribed reference value, and standby operation means which causes at least one elevator car to be on standby on a floor higher than the main floor and causes at least one elevator car to be on standby on the main floor when the standby mode for downward traffic flow has been made effective by the determination means.

Also, an elevator group control apparatus of the present invention is an apparatus which performs the operation control of a plurality of elevators. The elevator group control apparatus comprises traffic flow detection means which detects an upward traffic flow ratio of traffic flows departing upward from a prescribed main floor in the total traffic flow departing from one floor to another, determination means which makes a prescribed standby mode for upward traffic flow effective when the upward traffic flow ratio detected by the traffic flow detection means is not less than a prescribed reference value, and standby operation means which causes at least one elevator car to be on standby on the main floor when the standby mode for upward traffic flow has been made effective by the determination means.

Advantageous Effects of Invention

According to the present invention, it becomes possible to substantially improve the waiting time of users in time zones accounting for large proportions of an elevator use condition of a day, for example, in off-hour zones and time zones in which traffic demand is relatively small.

DESCRIPTION OF EMBODIMENTS

The present invention will be described in more detail with reference to the accompanying drawings. Incidentally, in each of the drawings, like numerals refer to like or similar parts and redundant descriptions of these parts are appropriately simplified or omitted.

First Embodiment

Figure 1:
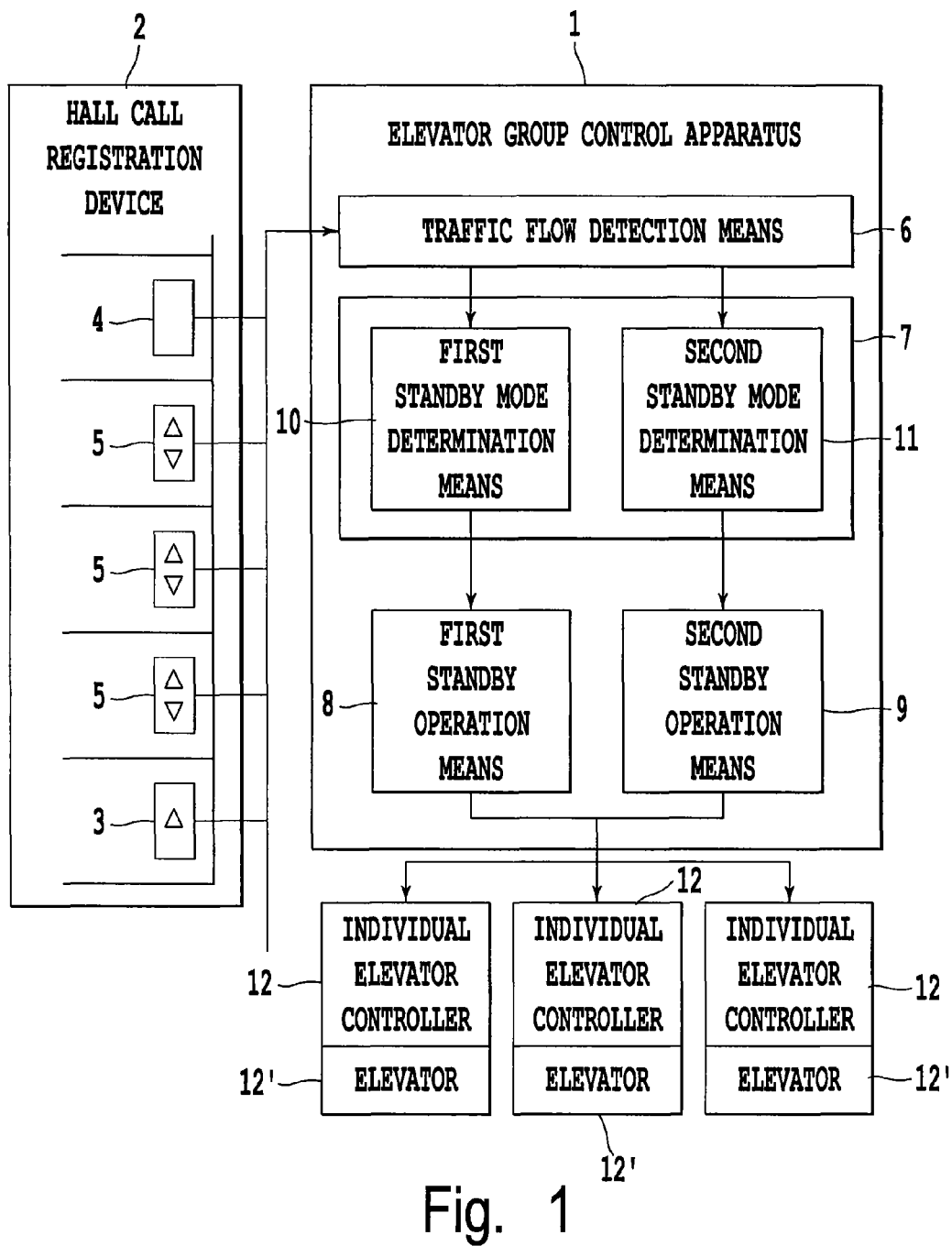
FIG. 1 is a block diagram showing an elevator group control apparatus in a first embodiment according to the present invention.

FIG. 1 is a block diagram showing an elevator group control apparatus in a first embodiment according to the present invention. In FIG. 1, reference numeral 1 denotes a group control apparatus which controls a plurality of elevators installed in a large-scale building and the like as one group. A group of elevators controlled by this group control apparatus 1 may be all of the elevators installed in a building or may be part of the elevators installed in the building.

Reference numeral 2 denotes a hall call registration device provided in each hall of the elevators. An elevator user registers his or her desired hall call by operating this hall call registration device 2 in each hall. Specifically, the hall on the bottom floor is provided with hall buttons 3 for registering upward hall calls, and the hall on the top floor is provided with hall buttons 4 for registering downward hall calls. Also, the halls on other floors except the bottom floor and the top floor are each provided with hall buttons 5 for registering upward and downward hall calls.

Information on a hall call registered by operating the hall call registration device 2 (hereinafter referred to as "hall call registration information") is transmitted to the group control apparatus 1. Incidentally, the above-described hall call registration information is composed of prescribed information which enables, for example, a floor on which a hall call has been registered and a running direction (an upward direction or a downward direction) from the floor to be identified in the group control apparatus 1.

The group control apparatus 1 sets an appropriate elevator standby mode which can shorten the waiting time of users on the basis of the hall call registration information received from the hall call registration device 2. In order to realize such a function, the group control apparatus 1 is provided with traffic flow detection means 6, determination means 7, and standby operation means (first standby operation means 8 and second standby operation means 9).

The traffic flow detection means 6 has the function of detecting the downward traffic flow ratio Pdn and the upward traffic flow ratio Pmainup for the above-described plurality of elevators supervised and controlled by the group control apparatus 1 on the basis of the hall call registration information received from the hall call registration device 2. In this connection, the downward traffic flow ratio Pdn refers to the proportion of traffic flows departing downward from floors higher than a prescribed main floor in the total traffic flow departing from one floor to another with respect to the above-described plurality of elevators.

Incidentally, in the following, a description will be given of the case where the above-described main floor is the lobby floor of the building (for example, the bottom floor shown in FIG. 1).

Specifically, the traffic flow detection means 6 computes the downward traffic flow ratio Pdn on the basis of the following expression (Math. 1).

$$Pdn = \frac{Nnmldn10}{Nmainup10 + Nnmlup10 + Nnmldn10} \quad [\text{Math. 1}]$$

where, Nmainup10 designates the number of upward hall calls registered on the lobby floor for the last 10 minutes, Nnmlup 10 designates the number of upward hall calls registered on floors higher than the lobby floor for the last 10 minutes, and Nnmldn10 designates the number of downward hall calls registered on floors higher than the lobby floor for the last 10 minutes.

Also, Pdn=0 when Nmainup10+Nnmlup10+Nnmldn10=0.

On the other hand, the upward traffic flow ratio Pmainup refers to the proportion of traffic flows departing upward from the lobby floor (main floor) in the total traffic flow departing from one floor to another with respect to the above-described plurality of elevators. The traffic flow detection means 6 computes the upward traffic flow ratio Pmainup on the basis of the following expression (Math. 2).

$$Pmainup = \frac{Nmainup10}{Nmainup10 + Nnmlup10 + Nnmldn10} \quad [\text{Math. 2}]$$

where, $Pmainup =$ 0 when $Nmainup10 + Nnmlup10 + Nnmldn10 = 0$.

In this embodiment, the description is given of the case where the computation of the traffic flow is performed on the basis of the number of hall calls registered on each service floor of an elevator for the last 10 minutes, that is, in the case where the downward traffic flow ratio Pdn and the upward traffic flow ratio Pmainup are computed. However, this is merely an example, and the period for which the number of hall calls is counted may be set at a time longer or shorter than 10 minutes on the basis of the environment in which the elevators are installed.

In the computation of the downward traffic flow ratio Pdn and the upward traffic flow ratio Pmainup, it is also possible to use the number of hall calls in the same time zone of the latest past day (including also a plurality of days) having the same calendar attributes, such as weekday and holiday (in the case of a plurality of days, an average value thereof), instead of using the number of hall calls in the last prescribed period. Furthermore, it is also possible to use a weighted average of the number of hall calls in the last prescribed period and the number of hall calls in the same time zone of the above-described past day.

Additionally, traffic flow predictions which involve using a neural network may also be used in the computation of the downward traffic flow ratio Pdn and the upward traffic flow ratio Pmainup. For traffic flow predictions which involve using a neural network, a concrete method is described in Non-Patent Literature 1 below.

Non-Patent Literature 1: Masashi Iwata, Shiro Hikita, Kiyotoshi Komatani, "Detection of Elevator Traffic Flow by Neural Network" Collection of Papers of the Society of Instrument and Control Engineers, Vol. 33, No. 3, pp. 209-215, 1997

Although in this embodiment the description is given of the case where the main floor is one floor (lobby floor), a plurality of floors may be set as the main floor. In this case, for example, as Nmainup10, the total sum of the number of upward hall calls registered on each main floor for the last 10 minutes is applied.

The determination means 7 has the function of appropriately selecting the standby mode of an elevator by making a comparison between each traffic flow ratio detected by the traffic flow detection means 6 and a prescribed reference value. Specifically, the determination means 7 is provided with first standby mode determination means 10 and second standby mode determination means 11.

The above-described first standby mode determination means 10 is intended for performing the setting of a standby mode for downward traffic flow. That is, the first standby mode determination means 10 makes a comparison between the downward traffic flow ratio Pdn detected by the traffic flow detection means 6 and a prescribed reference value αdn, and makes a prescribed standby mode for downward traffic flow effective when the first standby mode determination means 10 determines that the downward traffic flow ratio Pdn is not less than the reference value αdn when any standby modes have not been set. Also, the first standby mode determination means 10 makes a comparison between the upward traffic flow ratio Pmainup detected by the traffic flow detection means 6 and a prescribed reference value βdn, and makes the above-described standby mode for downward traffic flow ineffective when the first standby mode determination means 10 determines that the upward traffic flow ratio Pmainup is not less than the reference value βdn after making the above-described standby mode for downward traffic flow effective.

Each of the above-described reference values is set beforehand like (αdn, βdn)=(0.7, 0.3), for example.

Incidentally, the first standby mode determination means 10 may also be configured in such a manner as to make a comparison between the downward traffic flow ratio Pdn and another prescribed reference value α1dn after making the above-described standby mode for downward traffic flow effective so as to make the above-described standby mode for downward traffic flow ineffective also when the downward traffic flow ratio Pdn has become smaller than the reference value α1dn.

The first standby operation means 8 transmits prescribed standby operation instructions to individual elevators 12' having elevator controllers 12 when the standby mode for downward traffic flow has been made effective by the first standby mode determination means 10, and causes each elevator to perform necessary actions based on the standby mode for downward traffic flow.

Incidentally, through the transmission of standby operation instructions based on the standby mode for downward traffic flow to individual elevator controllers 12, car allocation is performed in such a manner that at least one car is caused to be on standby on the lobby floor and at least one car is caused to be on standby on an intermediate floor higher than the lobby floor. For example, in the case where there is a car which has no call to respond to and is at a standstill with the door closed, this car is caused to run to the above-described parking floor and caused to be on standby. When there is a car which is scheduled to make a stop at the above-described parking floor within a prescribed time or there is a car which is scheduled to finish its run in the vicinity of the above-described parking floor, the car can be allocated to the above-described parking floor after responses to the calls have been completed.

On the other hand, the above-described second standby mode determination means 11 is intended for performing the setting of a standby mode for upward traffic flow. That is, the second standby mode determination means 11 makes a comparison between the upward traffic flow ratio Pmainup detected by the traffic flow detection means 6 and a prescribed reference value αup, and makes a prescribed standby mode for upward traffic flow effective when the second standby mode determination means 11 determines that the upward traffic flow ratio Pmainup is not less than the reference value αup when any standby modes have not been set. Also, the second standby mode determination means 11 makes a comparison between the downward traffic flow ratio Pdn detected by the traffic flow detection means 6 and a prescribed reference value βup, and makes the above-described standby mode for upward traffic flow ineffective when the second standby mode determination means 11 determines that the downward traffic flow ratio Pdn is not less than the reference value βup after making the above-described standby mode for upward traffic flow effective.

Each of the above-described reference values is set beforehand like (αup, βup)=(0.6, 0.4), for example.

Incidentally, the second standby mode determination means 11 may also be configured in such a manner as to make a comparison between the upward traffic flow ratio Pmainup and another prescribed reference value α1up after making the above-described standby mode for upward traffic flow effective so as to make the above-described standby mode for upward traffic flow ineffective even when the upward traffic flow ratio Pmainup has become smaller than the reference value α1up.

The second standby operation means 9 transmits prescribed standby operation instructions to the individual elevator controllers 12 when the standby mode for upward traffic flow has been made effective by the second standby mode determination means 11, and causes each elevator to perform necessary actions based on the standby mode for upward traffic flow.

Incidentally, through the transmission of standby operation instructions based on the standby mode for upward traffic flow to individual elevator controllers 12, car allocation is performed in such a manner that at least one car is caused to be on standby on the lobby floor. For example, in the case where there is a car which has no call to respond to and is at a standstill with the door closed, this car is caused to run to the above-described parking floor and caused to be on standby. When there is a car which is scheduled to make a stop at the above-described parking floor within a prescribed time or there is a car which is scheduled to finish its run in the vicinity of the above-described parking floor, this car can be allocated to the above-described parking floor after responses to the calls have been completed.

Figure 2:
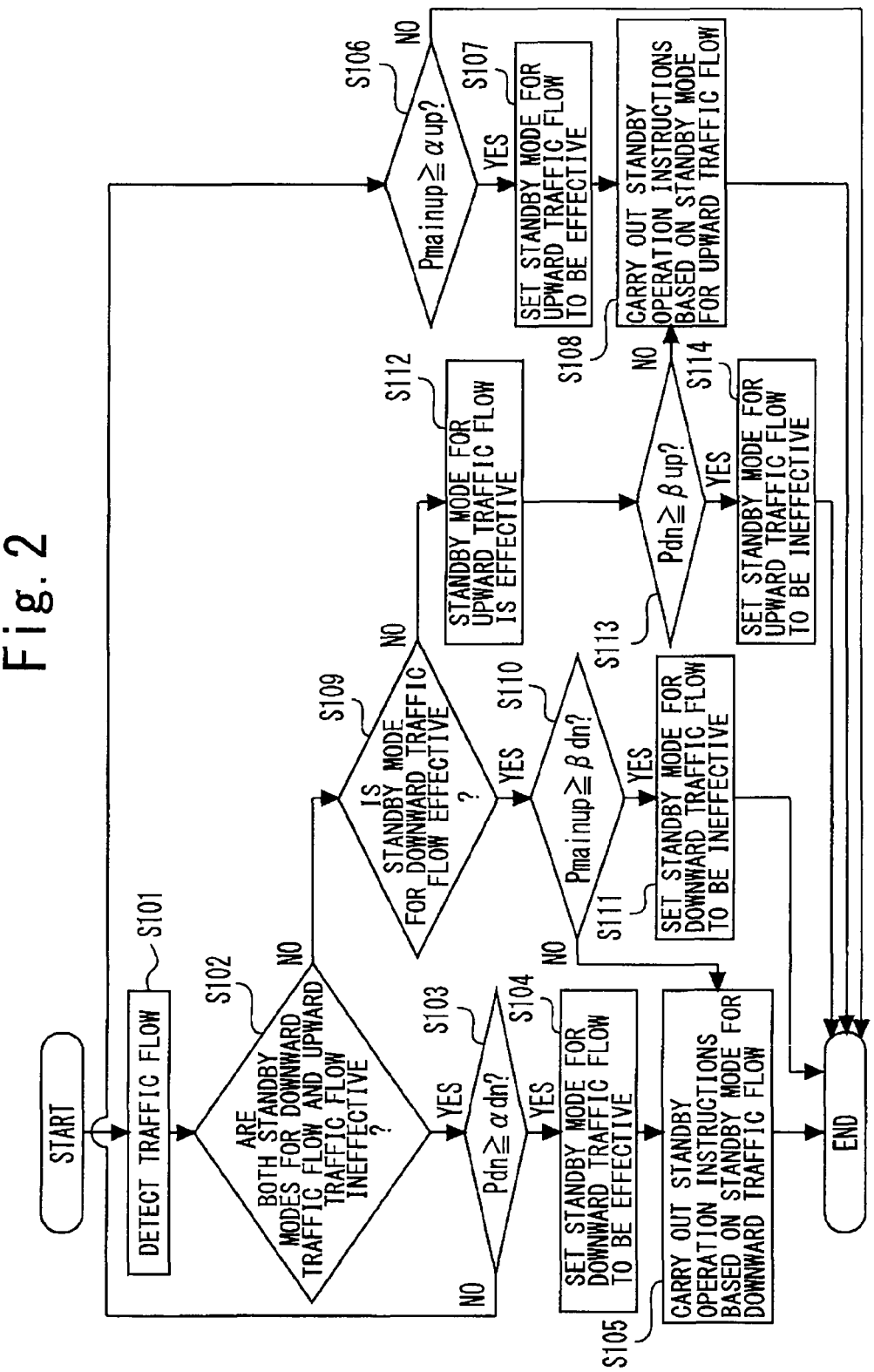
FIG. 2 is a flowchart showing the operation of the elevator group control apparatus in the first embodiment according to the present invention.

Next, with reference to FIG. 2, a description will be given of a concrete operation of the elevator group control apparatus 1 having the above-described configuration. FIG. 2 is a flowchart showing the operation of the elevator group control apparatus in the first embodiment according to the present invention.

In the group control apparatus 1, first, the detection of traffic flows is performed by the traffic flow detection means 6 (S101). Specifically, the downward traffic flow ratio Pdn and the upward traffic flow ratio Pmainup are detected on the basis of hall call registration information from the hall call registration device 2. Besides, the group control apparatus 1 makes a determination as to whether or not each standby mode for downward traffic flow and for upward traffic flow is ineffective (S102).

If it is determined in S102 that both standby modes for downward traffic flow and for upward traffic flow are ineffective, in the group control apparatus 1, a comparison is made by the first standby mode determination means 10 between the downward traffic flow ratio Pdn and the reference value αdn (S103). If the condition Pdn≥αdn holds in this comparison (Yes in S103), the group control apparatus 1 set the standby mode for downward traffic flow to be effective and causes the first standby operation means 8 to transmit standby operation instructions based on the set contents (S104, S105).

If the condition Pdn≥αdn does not hold in the comparison of S103 (No in S103), next, the group control apparatus 1 make a comparison between the upward traffic flow ratio Pmainup and the reference value αup through the use of the second standby mode determination means 11 (S106). If the condition Pmainup≥αup holds in this comparison (Yes in S106), the group control apparatus 1 sets the standby mode for upward traffic flow to be effective and causes the second standby operation means 9 to transmit standby operation instructions based on the set contents (S107, S108).

On the other hand, if the result of the determination is No in S102, the group control apparatus 1 performs the identification of an effective standby mode and thereafter performs prescribed processing suited to the result of the identification.

Specifically, first, the group control apparatus 1 makes a determination as to whether or not the standby mode for downward traffic flow is effective (S109). If the standby mode for downward traffic flow is effective, next, the group control apparatus 1 makes a comparison between the upward traffic flow ratio Pmainup and the reference value βdn through the use of the first standby mode determination means 10 (S110). If the condition Pmainup≥βdn holds in this comparison (Yes in S110), the group control apparatus 1 sets the standby mode for downward traffic flow, which is presently effective, to be ineffective (S111). If the condition Pmainup≥βdn does not hold in the comparison of S110 (No in S110), the flow of actions proceeds to S105, where the standby mode for downward traffic flow is continued to be set to be effective.

On the other hand, if it is determined in S109 that the standby mode for downward traffic flow is ineffective, this means that the standby mode for upward traffic flow has been set to be effective (S112). In this case, the group control apparatus 1 makes a comparison between the downward traffic flow ratio Pdn and the reference value βup through the use of the second standby mode determination means 11 (S113). If the condition Pdn≥βup holds in this comparison (Yes in S113), the group control apparatus 1 sets the standby mode for upward traffic flow, which is presently effective, to be ineffective (S114). If the condition Pdn≥βup does not hold in the comparison of S113 (No in S113), the flow of actions proceeds to S108, where the standby mode for upward traffic flow is continued to be set to be effective.

Incidentally, each of the above-described series of actions comes to an end when the flow of actions has proceeded to any one of S105, S108, S111 and S114 or when the result of the determination in S106 is No. The group control apparatus 1 repeats the above-described series of actions at prescribed intervals.

According to the first embodiment of the present invention, when the movement of users is heavy in an unbalanced manner in the upward direction from the lobby floor or in the downward direction from upper floors in all elevator situations in off-hour zones, congested time zones and the like, it is possible to set a standby mode suited to the direction in question. For this reason, in time zones in which the movement of users is heavy in an unbalanced manner in the upward direction from the lobby floor or in the downward direction from upper floors, that is, when the standby control function is effective in an improvement in waiting time, the waiting time of users is improved by making the standby mode effective so as to be adapted to the moving direction of users. On the other hand, when the imbalance of the movement of users is small and the standby control function is not effective in improving waiting time, the standby mode is made ineffective, whereby it becomes possible to achieve energy savings by reducing the power consumption during runs without greatly worsening the waiting time of users. Consequently, because a standby mode is made effective only in time zones in which the standby mode is very effective in improving waiting time, it becomes possible to achieve energy savings without greatly worsening the waiting of users in the whole day.

Because a determination is made as to whether the setting of a standby mode is necessary or not on the basis of the downward traffic flow ratio Pdn and the upward traffic flow ratio Pmainup, it becomes possible to make an accurate determination suited to traffic flows and this enables comfortable services to be provided to users.

In this embodiment, the description was given of the case where users register their hall calls in the upward direction or downward direction from a hall of an elevator. However, the group control apparatus 1 of the above-described configuration can also be applied to a system by use of which all users register their destination floors (destination calls) from halls, such as a hall destination prediction system. In this case, it is also possible for the traffic flow detection means 6 to detect the downward traffic flow ratio Pdn and the upward traffic flow ratio Pmainup on the basis of the number of users departing from each service floor of an elevator.

Incidentally, by performing the traffic flow detection on the basis of the number of hall calls or the number of users, it is possible to compute the downward traffic flow ratio Pdn and the upward traffic flow ratio Pmainup without requiring special logic and devices.

Second Embodiment

In buildings where the number of elevator users is small, such as apartments, cases in which users consecutively use elevators are apt to occur. For example, when an inhabitant of an apartment disposes of garbage, this inhabitant moves to a lobby floor by using an elevator from the floor where his or her house is located, and after the disposal of the garbage, the inhabitant moves to the floor where his or her house is located by boarding the car of an elevator from the lobby floor before other persons use the elevator.

In this case, as described in the first embodiment above, if the car is moved to a parking floor immediately after the completion of services to all calls, for example, when the above-described inhabitant returns from the lobby floor to the floor where his or her house is located, the waiting time of the user on the lobby floor may sometimes become long. Therefore, in this embodiment, the configuration is such that the run of a car to a parking floor is started when a prescribed delay time (for example, one minute, two minutes or so) has elapsed after the completion of responses to all calls to the car.

Figure 3:
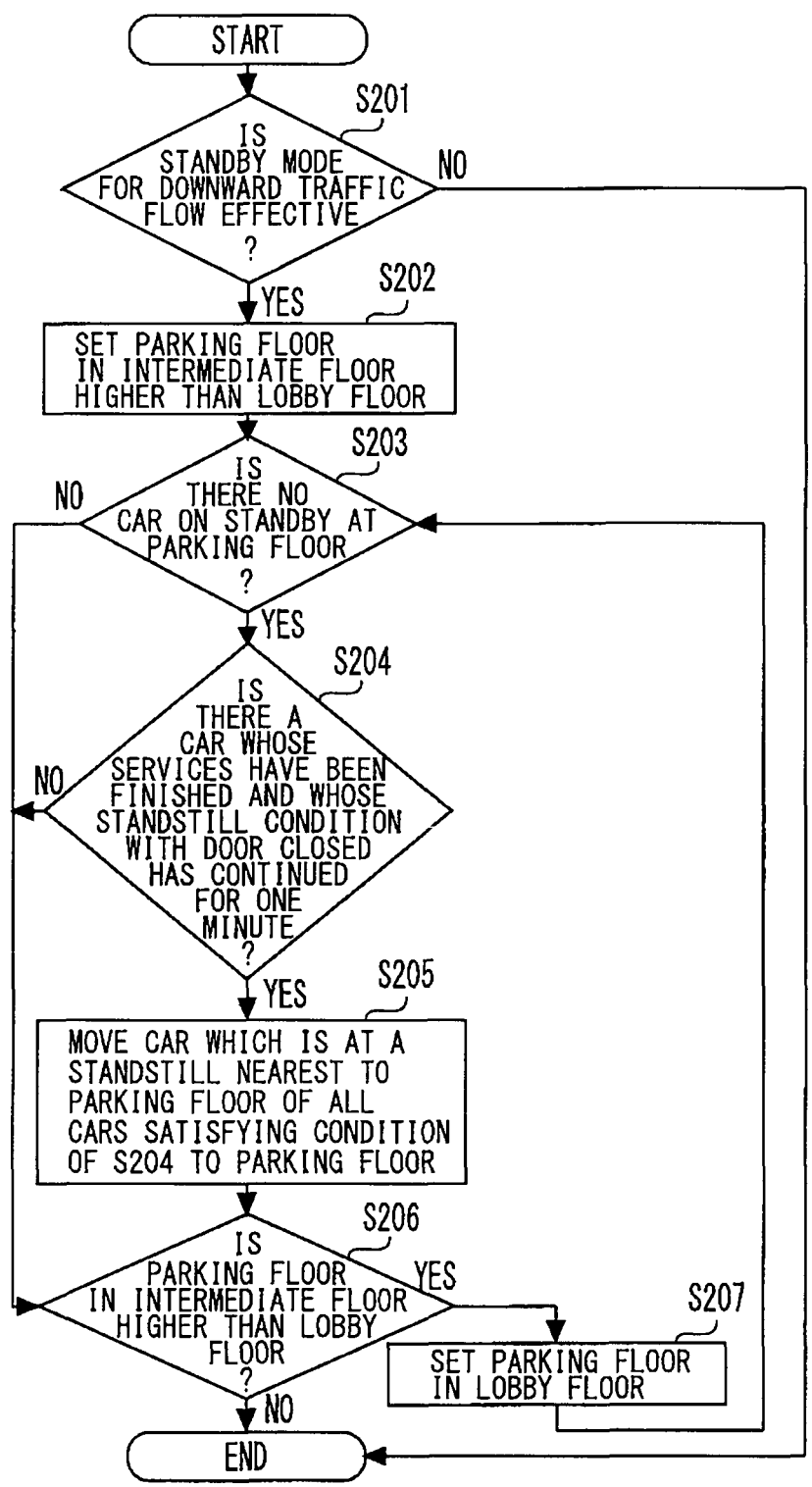
FIG. 3 is a flowchart showing the operation of the elevator group control apparatus in a second embodiment according to the present invention.

With reference to FIG. 3, a concrete operation of a group control apparatus 1 in this embodiment will be described below.

FIG. 3 is a flowchart showing the operation of the elevator group control apparatus in the second embodiment according to the present invention.

If the standby mode for downward traffic flow is effective (Yes in S201), the group control apparatus 1 sets a parking floor (a floor which is set in order to cause a car whose services to all calls have been finished to be on standby) in an intermediate floor which is higher than the lobby floor (S202), and makes a determination as to whether there is no car on standby at the parking floor (S203).

If it is determined in S203 that there is no car on standby at the parking floor, next, the group control apparatus 1 makes a determination as to whether or not there is a car whose services to all calls have been finished and whose standstill condition with the door closed has continued for a time of not less than the above-described delay time (for example, one minute) (S204). If there are cars satisfying the condition of S204, the car which is at a standstill nearest to the parking floor of all cars satisfying the condition is caused to move the parking floor (S205).

After the flow of actions proceeds to S205 or if the result is No in S203 or S204, next, the group control apparatus 1 makes a determination as to a set floor for the parking floor. If the parking floor has been set in an intermediate floor higher than the lobby floor (Yes in S206), the group control apparatus 1 resets the parking floor in the lobby floor (S207) and the flow of actions returns to the processing of S203, where the above-described actions are repeated. On the other hand, if it is determined in S206 that the parking floor has not been set in an intermediate floor which is an upper floor, the series of actions are finished.

According to the second embodiment of the present invention, a car whose services to all calls have been finished starts a run to the parking floor after a prescribed delay time has elapsed. For this reason, for example, even when an elevator user has finished his or her business on the floor at which the elevator user had got off the car and immediately thereafter the user uses an elevator, the waiting time of the user does not become long and, furthermore, it becomes possible to prevent an increase in power consumption due to wasteful runs of cars.

It is unnecessary to always set a given value as the above-described delay time and, for example, it is possible to adopt a configuration which is such that delay time is appropriately changed according to time zones and the like.

Industrial Applicability

The elevator group control apparatus according to the present invention can be applied to group control apparatus which perform the operation control of a plurality of elevators.

REFERENCE SIGNS LIST 1 group control apparatus
2 hall call registration device
3, 4, 5 hall button
6 traffic flow detection means
7 determination means
8 first standby operation means
9 second standby operation means
10 first standby mode determination means
11 second standby mode determination means
12 individual elevator controller

The invention claimed is:

1. An elevator group control apparatus which performs operation control of a plurality of elevators, comprising:
a traffic flow detection device which detects a downward traffic flow ratio of traffic flows departing downward from floors higher than a prescribed main floor in a total traffic flow departing from one floor to another;
a determination device which makes a prescribed standby mode for downward traffic flow effective when the downward traffic flow ratio detected by the traffic flow detection device is not less than a prescribed reference value; and
a standby operation device which causes at least one elevator car to be on standby on a floor higher than a main floor and causes at least one elevator car to be on standby on the main floor when the standby mode for downward traffic flow has been made effective by the determination device.

2. The elevator group control apparatus according to claim 1, wherein
the traffic flow detection device detects an upward traffic flow ratio of traffic flows departing upward from the main floor in the total traffic flow departing from one floor to another; and
the determination device makes the standby mode for downward traffic flow ineffective when the upward traffic flow ratio of not less than a prescribed reference value has been detected by the traffic flow detection device after the determination device has made the standby mode for downward traffic flow effective.

3. The elevator group control apparatus according to claim 1,
wherein the traffic flow detection device detects the downward traffic flow ratio or the upward traffic flow ratio on the basis of a number of hall calls registered on each service floor of an elevator.

4. The elevator group control apparatus according to claim 1,
wherein the traffic flow detection device detects the downward traffic flow ratio or the upward traffic flow ratio on the basis of a number of users departing from each service floor of an elevator.

5. The elevator group control apparatus according to claim 1,
wherein the traffic flow detection device detects the downward traffic flow ratio or the upward traffic flow ratio on the basis of traffic flows in a same time zone of a past day having same calendar attributes.

6. The elevator group control apparatus according to claim 1,
wherein the traffic flow detection device detects the downward traffic flow ratio or the upward traffic flow ratio on the basis of a weighted average of traffic flows in an immediately preceding, prescribed period and traffic flows in a same time zone of a past day having same calendar attributes.

7. The elevator group control apparatus according to claim 1,
wherein the standby operation device causes an elevator car to start running to a prescribed service floor when a prescribed time has elapsed after completion of responses to all calls to the car in a case a prescribed standby mode has been made effective by the determination device and the elevator car is caused to be on standby on the prescribed service floor.

8. An elevator group control apparatus which performs operation control of a plurality of elevators, comprising:
a traffic flow detection device which detects an upward traffic flow ratio of traffic flows departing upward from a prescribed main floor in a total traffic flow departing from one floor to another;
a determination device which makes a prescribed standby mode for upward traffic flow effective when the upward traffic flow ratio detected by the traffic flow detection device is not less than a prescribed reference value; and
a standby operation device which causes at least one elevator car to be on standby on a main floor when the standby mode for upward traffic flow has been made effective by the determination device.

9. The elevator group control apparatus according to claim 8, wherein
the traffic flow detection device detects a downward traffic flow ratio of traffic flows departing downward from floors higher than the main floor in the total traffic flow departing from one floor to another; and
the determination device makes the standby mode for upward traffic flow ineffective when the downward traffic flow ratio of not less than a prescribed reference value has been detected by the traffic flow detection device after the determination device has made the standby mode for upward traffic flow effective.

10. The elevator group control apparatus according to claim 8, wherein the traffic flow detection device detects the downward traffic flow ratio or the upward traffic flow ratio on the basis of a number of hall calls registered on each service floor of an elevator.

11. The elevator group control apparatus according to claim 8,
wherein the traffic flow detection device detects the downward traffic flow ratio or the upward traffic flow ratio on the basis of a number of users departing from each service floor of an elevator.

12. The elevator group control apparatus according to claim 8,
wherein the traffic flow detection device detects the downward traffic flow ratio or the upward traffic flow ratio on the basis of traffic flows in a same time zone of a past day having same calendar attributes.

13. The elevator group control apparatus according to claim 8,
wherein the traffic flow detection device detects the downward traffic flow ratio or the upward traffic flow ratio on the basis of a weighted average of traffic flows in an immediately preceding, prescribed period and traffic flows in a same time zone of a past day having same calendar attributes.

14. The elevator group control apparatus according to claim 8,
wherein the standby operation device causes an elevator car to start running to a prescribed service floor when a prescribed time has elapsed after completion of responses to all calls to the car in a case a prescribed standby mode has been made effective by the determination device and the elevator car is caused to be on standby on the prescribed service floor.

* * * * *